United States Patent [19]

Yoshimoto et al.

[11] Patent Number: 5,049,364

[45] Date of Patent: Sep. 17, 1991

[54] METHODS FOR DENITRIZATION

[75] Inventors: Masafumi Yoshimoto; Tadao Nakatsuji; Kazuhiko Nagano, all of Osaka, Japan

[73] Assignee: Sakai Chemical Industry Co., Ltd., Osaka, Japan

[21] Appl. No.: 518,560

[22] Filed: Jun. 6, 1990

Related U.S. Application Data

[62] Division of Ser. No. 417,422, Oct. 5, 1989.

Foreign Application Priority Data

| Oct. 5, 1988 | [JP] | Japan | 63-251361 |
| Oct. 6, 1988 | [JP] | Japan | 63-253401 |
| Nov. 2, 1988 | [JP] | Japan | 63-277693 |
| Nov. 2, 1988 | [JP] | Japan | 63-277694 |

[51] Int. Cl.$^5$ ............................ B01J 8/00; B01J 8/62; B01J 23/40; C01B 21/00
[52] U.S. Cl. ............................ 423/239; 423/213.5; 502/326
[58] Field of Search ............ 423/235, 235 D, 213.5, 423/239, 239 A; 502/326

[56] References Cited

U.S. PATENT DOCUMENTS

| 3,459,494 | 8/1969 | Harris et al. | 423/239 |
| 4,105,590 | 8/1978 | Koberstein et al. | 502/309 |
| 4,440,874 | 4/1984 | Thompson | 502/327 |

Primary Examiner—Gregory A. Heller
Attorney, Agent, or Firm—Wenderoth, Lind & Ponack

[57] ABSTRACT

A denitrizing catalyst which comprises:
(a) an alkali metal oxide or an alkaline earth metal oxide in amounts of 50-90% by weight as oxides;
(b) at least one metal oxide selected from the group consisting of $Co_3O_4$, $Cu_2O$, $Cr_2O_3$, $Mn_2O_3$, NiO, PbO, $Bi_2O_3$, $MoO_2$, $Al_2O_3$, $SiO_2$, $ZrO_2$, $Fe_2O_3$, $TiO_2$, $WO_3$, $MoO_3$, $SnO_2$ and ZnO in amounts of 5-50% by weight as oxides; and
(c) at least one metal or at least one oxide of metals selected from the group consisting of Ru, Rh, Pd, Ag, Pt and Au in amounts of 0.01-10% by weight as metals.

Nitrogen oxides contained in waste gases are denitrized effectively by putting the gases into contact with the catalysts in the absence or presence of carbon monoxide as a reducing agent.

4 Claims, No Drawings

METHODS FOR DENITRIZATION

This is a Rule 60 Divisional of Ser. No. 07/417,422 filed Oct. 5, 1989.

This invention relates to a catalyst and a method for denitrization of nitrogen oxides contained in waste gases.

There are already known a variety of methods for denitrizing nitrogen oxides contained in waste gases, among which are for example a method wherein nitrogen oxides are oxidized and absorbed in alkali solutions and a further method wherein nitrogen oxides are reduced to nitrogen using ammonia as a reducing agent in the presence of catalysts. However, the former method requires treatment of the resultant waste water, hence the method is costly, while the latter method has a disadvantage in that ammonia reacts with sulfur oxides which are usually contained in waste gases together with nitrogen oxides to form ammonium salts such as ammonium sulfate which deposites on the catalysts and hence decreases denitrizing activity of the catalysts during the denitrizing operations.

A further method is also known in which nitrogen oxide is reduced to nitrogen using carbon monoxide as a reducing agent in the presence of catalysts. In this method no salt is formed during denitrizing operations, but when waste gases containing oxygen therein, as is as usually the case, are treated, the reduction of nitrogen oxides is not carried out effectively on account of the reaction of carbon monoxide with oxygen as side reactions.

Therefore, catalysts have also been proposed which directly decompose nitrogen oxides in the absence of a reducing agent, however, such catalysts have hitherto been found very low in denitrizing activity.

It is, therefore, an object of the invention to provide a novel denitrizing catalyst which effectively decomposes nitrogen oxides in the absence of a reducing agent.

It is a further object of the invention to provide a novel denitrizing catalyst which effectively decomposes nitrogen oxides in the presence of carbon monoxide as a reducing agent.

It is still an object of the invention to provide a method of decomposing nitrogen oxides in the presence or absence of a reducing agent.

The denitrizing catalyst of the invention comprises:
(a) an alkali metal oxide or an alkaline earth metal oxide in amounts of 50–90% by weight as oxides;
(b) at least one metal oxide selected from the group consisting of $Co_3O_4$, $Cu_2O$, $Cr_2O_3$, $Mn_2O_3$, NiO, PbO, $Bi_2O_3$, $MoO_2$, $Al_2O_3$, $SiO_2$, $ZrO_2$, $Fe_2O_3$, $TiO_2$, $WO_3$, $MoO_3$, $SnO_2$ and ZnO in amounts of 5–50% by weight as oxides; and
(c) at least one metal or at least one oxide of a metal selected from the group consisting of Ru, Rh, Pd, Ag, Pt and Au in amounts of 0.01–10% by weight as metals.

More specifically, the metal oxide of the group (b) is preferably at least one of $Co_3O_4$, $Cu_2O$, $Cr_2O_3$, $Mn_2O_3$, NiO, PbO, $Bi_2O_3$ and $MoO_2$, or at least one of $Al_2O_3$, $SiO_2$, $ZrO_2$, $Fe_2O_3$, $TiO_2$, $WO_3$, $MoO_3$, $SnO_2$ and ZnO.

The alkali metal oxides or alkaline earth metal oxides are preferably calcium oxide, magnesium oxide, barium oxide or strontium oxide.

The denitrizing catalyst of the invention may be produced in a conventional manner using the metal oxides or precursors thereof such as hydroxides, nitrates, halides or the like of the metals as above mentioned.

By way of example, an alkaline earth metal oxide such as magnesium oxide, calcium oxide or strontium oxide is admixed with at least one of the metal oxides of the group (b), and the mixture is molded by, for example, extrusion, pelletizing or granulating, to molds. The molds are calcined at temperatures of 300°–800° C., immersed in aqueous solutions of at least one water soluble compounds of the metals of the group (c), dried and then calcined at temperatures of 300°–800° C. under an oxidative atmosphere to provide the catalyst of the invention. If necessary, the catalyst may be further calcined under a reducing atmosphere.

A further method is as follows. An alkaline earth metal salt and a metal salt, such as halides, nitrates or sulfates, corresponding to the metal oxides of the group (b) are dissolved in water. An alkali such as ammonia or sodium hydroxide is added to the resultant solution to form precipitates. The precipitates are then calcined at temperatures of 300°–800° C., and powdered. The powder is molded by, for example, extrusion, pelletizing or granulating. The obtained molds, if necessary after calcining at temperatures of 300°–800° C., are immersed in aqueous solutions of water soluble compounds of the metals of the group (c), dried and then calcined at temperatures of 300°–800° C. under an oxidative atmosphere, to provide the catalyst of the invention. If necessary, the catalyst may be further calcined under a reducing atmosphere.

The catalyst may also be produced by a method as follows. An alkali metal salt, a second metal salt, such as above mentioned, corresponding to metal oxides of the group (b) and water soluble compounds of the metals of the group (c) are dissolved in water. A precipitating agent such as an alkali, for example, ammonia or sodium hydroxide is added to the resultant solutions to form precipitates. The precipitates are dried, calcined at temperatures of 300°–800° C., and powdered. The powder is molded by, for example, extrusion, pelletizing or granulating, and then calcined at temperatures of 300°–800° C. under an oxidative atmosphere, to provide the catalyst of the invention. If necessary, the catalyst may be further calcined under a reducing atmosphere.

In the production of the catalyst of the invention, it is preferred that precursors are used to form active ingredients in the form of oxides. Thus, as precursors of the alkali metal oxides or alkaline metal oxides of the group (a), hydroxides or water soluble salts are preferably used. The hydroxides used include, for example, magnesium hydroxide, calcium hydroxide, barium hydroxide or strontium hydroxide. The water soluble salts used include, for example, nitrates such as magnesium nitrate, barium nitrate or strontium nitrate. Carbonates may also be preferably used as precipitating agents for these precursors.

As precursors of the metal oxides of the group (b), water soluble hydroxides or salts are preferred, such as cuprous nitrate, chromous nitrate, cobalt nitrate, manganese nitrate, nickel nitrate, bismuth nitrate, ammonium molybdate, aluminum nitrate, ferric chloride, ferric nitrate, titanyl nitrate, zinc nitrate, ammonium tungstate or stannous chloride. Hydroxides may be used, if desired, such as zirconium hydroxide.

Also as precursors of the metal oxides or metals of the group (c), water soluble compounds are preferably used, such as ruthenium chloride, rhodium nitrate, palladium chloride, silver nitrate, chloroplatinic acid or chloroauric acid.

The catalyst of the invention contains the metal oxides of the group (a) in amounts of 50-90%, preferably of 75-90% by weight, as oxides, the metal oxides of the group (b) in amounts of 5-50%, preferably of 10-25%, by weight, as oxides, and the metals or their oxides of the group (c) in amounts of 0.01-10%, preferably of 0.1-5%, by weight as metals, respectively, based on the total of the oxides, or the oxides and metals as above.

Known carrier materials such as titania, alumina or silica, molding assistants such as clay and/or reinforcements such as glass fibers may be contained in the catalyst. However, the amount of these additional materials is preferably not more than 50% by weight in total based on the resultant catalyst structures.

It is postulated based on the inventors' investigation that the elementary reactions of the denitrization of nitrogen oxides are as follows:

$$2NO + 2e^- \rightarrow 2NO^- \tag{1}$$

$$2NO^- \rightarrow N_2 + 2O^- \tag{2}$$

$$2O^- \rightarrow O_2 + 2e^- \tag{3}$$

$$O_2 \rightarrow O_2 \uparrow \tag{4}$$

It is likely that the oxides of the group (a) participate in the reactions (1) and (2), the oxides of the group (b) in the reaction (3) and the metals or their oxides of the group (c) in the reaction of (4). It is not yet clear to what extent the individual elementary reactions contribute to over-all reaction velocity, but it has been found that the combination of the ingredients in the above atomic ratios provides the catalyst with high denitrizing activity.

To carry out denitrization of nitrogen oxides contained in waste gases, the gases are put into contact with the catalyst at temperatures of 300°-800° C., preferably at temperatures of 400°-600° C. in a space velocity of 500-50000 hr$^{-1}$ in the absence of a reducing agent.

However, the waste gases may be put into contact with the catalyst in the presence of carbon monoxide as a reducing agent usually in amounts of 10-100 moles per mole of nitrogen gen oxides in the waste gases, although not limited thereto.

The invention will now be described with reference to examples, however, the invention is not limited thereto.

I. Preparation of Catalysts Containing At least One of Co$_3$O$_4$, Cu$_2$O, Cr$_2$O$_3$, Mn$_2$O$_3$, NiO, PbO, Bi$_2$O$_3$ and MoO$_2$ and Denitrization Using the Same

EXAMPLE 1

An amount of 90 g as oxides of magnesium nitrate and 9 g as oxides of cobalt nitrate were dissolved in one liter of deionized water. An aqueous solution of sodium carbonate was added to the resultant solution over one hour under stirring to neutralize the solution until the pH of the solution reached 7.0, and then stirred for another 30 minutes. The resultant precipitates were collected by filtration, washed with water, dried at 100° C. over 18 hours and calcined at 500° C. for three hours.

The calcined products were powdered with a sample mill provided with 0.5 mm screens. An amount of 50 g of the powder was dispersed in 200 ml of water to prepare an aqueous slurry.

A corrugated honeycomb of ceramic fiber sheets having a void ratio of 81% and a pitch of 4 mm was immersed in the slurry to carry MgO and Co$_3$O$_4$ thereon in a carrying rate of 159% by weight based on the honeycomb. The honeycomb was dried at room temperatures, dried at 100° C. for 18 hours, immersed in an aqueous solution of chloroauric acid of a concentration of 33 g/l as Au, dried at room temperatures for 18 hours and then calcined at 500° C. for three hours, to provide a catalyst containing Mg in amounts of 90% by weight as oxides, Co in amounts of 9% by weight as oxides, and Au in amounts of 1.6% by weight as metals.

EXAMPLE 2-1

An amount of 75 g as oxides of magnesium nitrate and 25 g as oxides of cobalt nitrate were used, and otherwise in the same manner as in the Example 1, a catalyst was prepared which contained Mg in amounts of 75% by weight as oxides, Co in amounts of 25% by weight as oxides, and Au in amounts of 1.6% by weight as metals.

EXAMPLE 2-1

An amount of 50 g as oxides of magnesium nitrate and 49 g as oxides of cobalt nitrate were used, and otherwise in the same manner as in the Example 1, a catalyst was prepared which contained Mg in amounts of 50% by weight as oxides, Co in amounts of 49% by weight as oxides, and Au in amounts of 1.6% by weight as metals.

EXAMPLE 3

An aqueous solution of chloroauric acid of a concentration of 165 g/l as Au was used, and otherwise in the same manner as in the Example 1, a catalyst was prepared which contained Mg in amounts of 90% by weight as oxides, Co in amounts of 9% by weight as oxides, and Au in amounts of 8% by weight as metals.

EXAMPLE 4

An aqueous solution of chloroplatinic acid of a concentration of 33 g/l as Pt was used in place of chloroauric acid, and otherwise in the same manner as in the Example 1, a catalyst was prepared which contained Mg in amounts of 90% by weight as oxides, Co in amounts of 9% by weight as oxides, and Pt in amounts of 1.6% by weight as metals.

EXAMPLE 5

An aqueous solution of ruthenium chloride of a concentration of 33 g/l as Ru was used in place of chloroauric acid, and otherwise in the same manner as in the Example 1, a catalyst was prepared which contained Mg in amounts of 90% by weight as oxides, Co in amounts of 9% by weight as oxides, and Ru in amounts of 1.6% by weight as metals.

EXAMPLE 6

An aqueous solution of silver nitrate of a concentration of 71 g/l as Ag$_2$O was used in place of chloroauric acid, and otherwise in the same manner as in the Example 1, a catalyst was prepared which contained Mg in amounts of 90% by weight as oxides, Co in amounts of 9% by weight as oxides, and Ag in amounts of 3.4% by weight as metals.

EXAMPLE 7

An amount of 9 g as oxides of cuprous chloride was used in place of cobalt nitrate, and sodium hydroxide was used in place of sodium carbonate to neutralize the solution to a pH of 3.0, and otherwise in the same manner as in the Example 1, a catalyst was prepared which contained Mg in amounts of 90% by weight as oxides, Cu in amounts of 9% by weight as oxides, and Au in amounts of 1.6% by weight as metals.

EXAMPLE 8

An amount of 9 g as oxides of chromous nitrate was used in place of cobalt nitrate, and the solution was neutralized to a pH of 5.5, and otherwise in the same manner as in the Example 1, a catalyst was prepared which contained Mg in amounts of 90% by weight as oxides, Cr in amounts of 9% by weight as oxides, and Au in amounts of 1.6% by weight as metals.

EXAMPLE 9

Manganese nitrate was used in place of cobalt nitrate, and the solution was neutralized by air oxidation to a pH of 8.5, and otherwise in the same manner as in the Example 4, a catalyst was prepared which contained Mg in amounts of 90% by weight as oxides, Mn in amounts of 9% by weight as oxides, and Pt in amounts of 1.6% by weight as metals.

EXAMPLE 10

Nickel nitrate was used in place of cobalt nitrate, and otherwise in the same manner as in the Example 4, a catalyst was prepared which contained Mg in amounts of 90% by weight as oxides, Ni in amounts of 9% by weight as oxides, and Pt in amounts of 1.6% by weight as metals.

EXAMPLE 11

Lead nitrate was used in place of cobalt nitrate, and otherwise in the same manner as in the Example 4, a catalyst was prepared which contained Mg in amounts of 90% by weight as oxides, Pb in amounts of 9% by weight as oxides, and Pt in amounts of 1.6% by weight as metals.

EXAMPLE 12

Bismuth nitrate was used in place of cobalt nitrate, and otherwise in the same manner as in the Example 4, a catalyst was prepared which contained Mg in amounts of 90% by weight as oxides, Bi in amounts of 9% by weight as oxides, and Pt in amounts of 1.6% by weight as metals.

EXAMPLE 13

Molybdenum bromide was used in place of cobalt nitrate, and otherwise in the same manner as in the Example 4, a catalyst was prepared which contained Mg in amounts of 90% by weight as oxides, Mo in amounts of 9% by weight as oxides, and Pt in amounts of 1.6% by weight as metals.

EXAMPLE 14

An aqueous solution of rhodium nitrate was used in place of chloroauric acid solution, and otherwise in the same manner as in the Example 7, a catalyst was prepared which contained Mg in amounts of 90% by weight as oxides, Cu in amounts of 9% by weight as oxides, and Rh in amounts of 1.6% by weight as metals.

EXAMPLE 15

An aqueous solution of palladium chloride was used in place of chloroauric acid solution, and otherwise in the same manner as in the Example 7, a catalyst was prepared which contained Mg in amounts of 90% by weight as oxides, Cu in amounts of 9% by weight as oxides, and Pd in amounts of 1.6% by weight as metals.

EXAMPLE 16-1

An aqueous solution of chloroplatinic acid having a concentration of 16 g/l as Pt was used, and otherwise in the same manner as in the Example 4, a catalyst was prepared which contained Mg in amounts of 90% by weight as oxides, Co in amounts of 9% by weight as oxides, and Pt in amounts of 0.8% by weight as metals.

EXAMPLE 16-2

An aqueous solution of chloroplatinic acid having a concentration of 66 g/l as Pt was used, and otherwise in the same manner as in the Example 4, a catalyst was prepared which contained Mg in amounts of 90% by weight as oxides, Co in amounts of 9% by weight as oxides, and Pt in amounts of 3.2% by weight as metals.

EXAMPLE 17

An amount of 4.5 g as oxides of cobalt nitrate and 4.5 g as oxides of chromium nitrate were used in place of 9 g of cobalt nitrate, and otherwise in the same manner as in the Example 4, a catalyst was prepared which contained Mg in amounts of 90% by weight as oxides, Co in amounts of 4.5% by weight as oxides, Cr in amounts of 4.5% by weight as oxides, and Pt in amounts of 1.6% by weight as metals.

EXAMPLE 18

An aqueous solution of chloroauric acid having a concentration of 33 g/l as Au and containing Na in amounts of 3 g/l was used, and otherwise in the same manner as in the Example 1, a catalyst was prepared which contained Mg in amounts of 90% by weight as oxides, Na in amounts of 0.2% by weight as oxides, Co in amounts of 9% by weight as oxides, and Au in amounts of 1.6% by weight as metals.

COMPARATIVE EXAMPLE 1

An amount of 50 g of a zeolite (ZSM-5 by Mobil Oil) was immersed in a 0.1N aqueous solution of cuprous chloride in a three necked flask provided with a condenser, and the solution was heated at 90°–120° C. over 12 hours. The zeolite was collected by filtration as a cake-like material, and then subjected to the same operations as above, to provide a zeolite in which Na was substituted for Cu in amounts of 4.8% by weight.

Then the zeolite was treated in the same manner as in the Example 1, to provide a known catalyst.

EXAMPLE 19

The catalyst prepared in the Example 4 was calcined at 400° C. over one hour under a $N_2/H_2$ (1/1 in volume) atmosphere.

EXAMPLE 20-1, 2 and 3

Calcium nitrate, strontium nitrate and barium nitrate were used, respectively, in place of cobalt nitrate, and otherwise in the same manner as in the Example 1, catalysts were prepared which contained which contained Mg in amounts of 90% by weight as oxides, Ca in amounts of 9% by weight as oxides, and Au in amounts of 1.6% by weight as metals; Mg in amounts of 90% by weight as oxides, Sr in amounts of 9% by weight as oxides, and Au in amounts of 1.6% by weight as metals; and Mg in amounts of 90% by weight as oxides, Ba in amounts of 9% by weight as oxides, and Au in amounts of 1.6% by weight as metals, respectively.

DENITRIZATION

A gas composed of 200 ppm of NO, 2% of $O_2$, 10% of $H_2O$ and the balance $N_2$ was passed through the catalysts in a space velocity of 1000 $hr^{-1}$ at 300° C., 400° C. and 500° C., respectively. The conversion rates of NO to $N_2$ are shown in the Table 1.

Further, a gas composed of 200 ppm of NO, 200 ppm of CO, 2% of $O_2$, 10% $H_2O$ and the balance $N_2$ was passed through the catalysts in a space velocity of 1000 $hr^{-1}$ at 300° C., 400° C. and 500° C., respectively. The conversion rates of NO to $N_2$ are shown in the Table 2.

TABLE 1

| Catalysts | Denitrizing Temperature (°C.) | | |
|---|---|---|---|
| | 400 | 500 | 600 |
| Example | | | |
| 1 | 63.6 | 88.4 | 81.8 |
| 2-1 | 65.3 | 89.6 | 87.9 |
| 2-2 | 62.3 | 87.2 | 84.7 |
| 3 | 88.4 | 97.0 | 99.4 |
| 4 | 60.0 | 87.8 | 92.0 |
| 5 | 44.9 | 69.6 | 76.0 |
| 6 | 50.1 | 82.4 | 86.4 |
| 7 | 74.2 | 91.5 | 94.1 |
| 8 | 63.8 | 84.2 | 88.2 |
| 9 | 60.3 | 78.0 | 76.9 |
| 10 | 53.9 | 75.5 | 80.1 |
| 11 | 33.2 | 57.7 | 59.5 |
| 12 | 38.0 | 61.6 | 65.1 |
| 13 | 45.7 | 66.4 | 68.5 |
| 14 | 56.7 | 81.3 | 82.5 |
| 15 | 66.3 | 84.7 | 86.8 |
| 16-1 | 59.3 | 80.5 | 83.2 |
| 16-2 | 70.4 | 88.6 | 89.9 |
| 17 | 76.5 | 88.1 | 83.6 |
| 18 | 73.4 | 91.0 | 88.5 |
| 19 | 78.9 | 93.2 | 92.2 |
| 20-1 | 63.0 | 83.6 | 80.4 |
| 20-2 | 60.0 | 81.1 | 77.7 |
| 20-3 | 57.4 | 78.8 | 75.9 |
| Comparative 1 | 34.5 | 44.4 | 49.7 |

TABLE 2

| Catalysts | Denitrizing Temperature (°C.) | | |
|---|---|---|---|
| | 400 | 500 | 600 |
| Example | | | |
| 1 | 70.3 | 92.1 | 86.8 |
| 2-1 | 71.0 | 93.4 | 92.0 |
| 2-2 | 69.8 | 91.6 | 88.3 |
| 3 | 92.1 | 98.4 | 99.6 |
| 4 | 64.8 | 90.8 | 93.5 |
| 5 | 51.4 | 76.0 | 81.6 |
| 6 | 58.9 | 87.3 | 90.5 |
| 7 | 80.6 | 93.7 | 96.5 |
| 8 | 72.1 | 88.9 | 92.3 |
| 9 | 70.0 | 83.7 | 82.5 |
| 10 | 60.8 | 81.5 | 85.4 |
| 11 | 38.5 | 62.8 | 63.7 |
| 12 | 43.9 | 69.2 | 73.6 |
| 13 | 52.8 | 73.0 | 75.2 |
| 14 | 63.4 | 86.2 | 87.7 |
| 15 | 72.3 | 88.4 | 91.0 |
| 16-1 | 65.7 | 85.9 | 88.2 |
| 16-2 | 76.5 | 92.6 | 93.6 |
| 17 | 82.4 | 91.9 | 88.2 |
| 18 | 79.6 | 94.4 | 92.2 |
| 19 | 84.2 | 95.9 | 94.6 |
| 20-1 | 71.7 | 88.6 | 83.4 |
| 20-2 | 66.7 | 85.9 | 83.5 |
| 20-3 | 64.1 | 84.0 | 81.9 |

II. Preparation of Catalysts Containing At least One of $Al_2O_3$, $SiO_2$, $ZrO_2$, $Fe_2O_3$, $TiO_2$, $WO_3$, $MoO_3$, $SnO_2$ and ZnO and Denitrization Using the Same

EXAMPLE 1

An amount of 90 g as oxides of magnesium nitrate and 9 g as oxides of aluminum nitrate were dissolved in one liter of deionized water. An aqueous solution of sodium carbonate was added to the resultant solution over one hour under stirring to neutralize the solution until the pH of the solution reached 7.0, and then stirred for another 30 minutes. The resultant precipitates were collected by filtration, washed with water, dried at 100° C. over 18 hours and calcined at 500° C. for three hours.

The calcined products were powdered with a sample mill provided 0.5 mm screens. An amount of 50 g of the powder was dispersed in 200 ml of water to prepare an aqueous slurry.

A corrugated honeycomb of ceramic fiber sheets having a void ratio of 81% and a pitch of 4 mm was immersed in the slurry to carry MgO and $Al_2O_3$ thereon in a carrying rate of 143% by weight based on the honeycomb. The honeycomb was dried at room temperatures, dried at 100° C. for 18 hours, immersed in an aqueous solution of chloroauric acid of a concentration of 33 g/l as Au, dried at room temperatures for 18 hours and then calcined at 500° C. for three hours, to provide a catalyst containing Mg in amounts of 90% by weight as oxides, Al in amounts of 9% by weight as oxides, and Au in amounts of 1.6% by weight as metals.

EXAMPLE 2

An amount of 50 g as oxides of aluminum nitrate and 50 g as oxides of titanyl nitrate were dissolved in one liter of deionized water. Ammonia was blown into the resultant solution under stirring to neutralize the solution until the pH of the solution reached 7.0 and stirring was continued for another 30 minutes. The resultant precipitates were collected by filtration, washed with water, dried at 100° C. over 18 hours and calcined at 600° C. for three hours. The calcined products were powdered with a sample mill provided 0.5 mm screens.

An amount of 50 g of the powder and 50 g of magnesia (produced by calcining magnesium hydroxide at 650° C. for one hour and having a specific surface area of 53 $m^2/g$) were added to 400 ml of water and wet-powdered for 30 minutes, to prepare an aqueous slurry.

A corrugated honeycomb of ceramic fiber sheets having a void ratio of 81% and a pitch of 4 mm was immersed in the slurry to carry MgO, $Al_2O_3$ and $TiO_2$ thereon in a carrying rate of 156% by weight based on the honeycomb.

The honeycomb was dried at room temperatures, dried at 100° C. for 18 hours, immersed in an aqueous solution of chloroauric acid of a concentration of 33 g/l as Au, dried at room temperatures for 18 hours and then calcined at 500° C. for three hours, to provide a catalyst containing Mg in amounts of 50% by weight as oxides, Al in amounts of 25% by weight as oxides, Ti in amounts of 25% by weight as oxides, and Au in amounts of 1.6% by weight as metals.

EXAMPLE 3

An amount of 75 g of MgO and 25 g of $Al_2O_3$-$TiO_2$ were used, and otherwise in the same manner as in the Example 2, a catalyst was prepared which contained Mg in amounts of 75% by weight as oxides, Al in amounts of 12.5% by weight as oxides, Ti in amounts of 12.5% by weight as oxides, and Au in amounts of 1.6% by weight as metals.

EXAMPLE 4

An aqueous solution of chloroauric acid of a concentration of 165 g/l as Au was used, and otherwise in the same manner as in the Example 2, a catalyst was prepared which contained Mg in amounts of 50% by weight as oxides, Al in amounts of 25% by weight as oxides, Ti in amounts of 25% by weight as oxides, and Au in amounts of 8% by weight as metals.

EXAMPLE 5-1

An aqueous solution of chloroplatinic acid of a concentration of 16 g/l as Pt was used in place of chloroauric acid, and otherwise in the same manner as in the Example 2, a catalyst was prepared which contained Mg in amounts of 50% by weight as oxides, Al in amounts of 25% by weight as oxides, Ti in amounts of 25% by weight as oxides, and Pt in amounts of 0.8% by weight as metals.

EXAMPLE 5-2

An aqueous solution of chloroplatinic acid of a concentration of 66 g/l as Pt was used in place of chloroauric acid, and otherwise in the same manner as in the Example 2, a catalyst was prepared which contained Mg in amounts of 50% by weight as oxides, Al in amounts of 25% by weight as oxides, Ti in amounts of 25% by weight as oxides and Pt in amounts of 3.2% by weight as metals.

EXAMPLE 6

An aqueous solution of ruthenium chloride of a concentration of 33 g/l as Ru was used in place of chloroauric acid, and otherwise in the same manner as in the Example 2, a catalyst was prepared which contained Mg in amounts of 50% by weight as oxides, Al in amounts of 25% by weight as oxides, Ti in amounts of 25% by weight as oxides, and Ru in amounts of 1.6% by weight as metals.

EXAMPLE 7

An aqueous solution of silver nitrate of a concentration of 71 g/l as $Ag_2O$ was used in place of chloroauric acid, and otherwise in the same manner as in the Example 2, a catalyst was prepared which contained Mg in amounts of 50% by weight as oxides, Al in amounts of 25% by weight as oxides, Ti in amounts of 25% by weight as oxides, and Ag in amounts of 3.4% by weight as metals.

EXAMPLE 8

An amount of 85 g as oxides of zirconium hydroxide and 15 g as oxides of ammonium metatungstate were fully kneaded together with water, dried at 100° C. over 18 hours and calcined at 700° C. for three hours. The calcined product was powdered with a sample mill provided with 0.5 mm screens.

Using an amount of 50 g of the powder and 50 g of the same magnesia as in the Example 2, a catalyst was prepared in the same manner as in the Example 2.

The catalyst contained Mg in amounts of 50% by weight as oxides, Zr in amounts of 42.5% by weight as oxides, W in amounts of 7.5% by weight as oxides, and Au in amounts of 1.6% by weight as metals.

EXAMPLE 9

An amount of 50 g as oxides of silica (Snowtex 0 by Nissan Kagaku Kogyo K.K.) and 50 g as oxides of metatitanic acid sol (produced by peptizing metatitanic acid with nitric acid) were admixed together, dried at 100° C. over 18 hours and then calcined at 700° C. for three hours. The calcined product was powdered in the same manner as in the Example 2.

Using an amount of 50 g of the powder and 50 g of calcia (produced by calcining basic calcium carbonate at 650° C. over one hour, and having a specific surface area of 46 $m^2/g$), a catalyst was prepared in the same manner as in the Example 2.

The catalyst contained Ca in amounts of 50% by weight as oxides, Si in amounts of 25.5% by weight as oxides, Ti in amounts of 25.5% by weight as oxides, and Au in amounts of 1.6% by weight as metals.

EXAMPLE 10

Palladium chloride was used in place of chloroplatinic acid, and otherwise in the same manner as in the Example 9, a catalyst was prepared which contained Ca in amounts of 50% by weight as oxides, Si in amounts of 25.5% by weight as oxides, Ti in amounts of 25.5% by weight as oxides, and Pd in amounts of 1.6% by weight as metals.

EXAMPLE 11

Rhodium nitrate was used in place of chloroplatinic acid, and otherwise in the same manner as in the Example 9, a catalyst was prepared which contained Ca in amounts of 50% by weight as oxides, Si in amounts of 25.5% by weight as oxides, Ti in amounts of 25.5% by weight as oxides, and Rh in amounts of 1.6% by weight as metals.

EXAMPLE 12

An aqueous ammonia solution of ammonium molybdate containing 50 g of Mo as oxides was added to an aqueous solution of bismuth nitrate containing 50 g of Bi as oxides, so that the resultant mixture had a pH of 7.0, to provide precipitates.

The a catalyst was prepared in the same manner as in the Example 2.

The catalyst contained Mg in amounts of 50% by weight as oxides, Mo in amounts of 25% by weight as oxides, Bi in amounts of 25% by weight as oxides, and Au in amounts of 1.6% by weight as metals.

EXAMPLE 13

Zinc nitrate was used in place of aluminum nitrate, and otherwise in the same manner as in the Example 2, a catalyst was prepared which contained Mg in amounts of 50% by weight as oxides, Zn in amounts of 25% by weight as oxides, Ti in amounts of 25% by weight as oxides, and Au in amounts of 1.6% by weight as metals.

EXAMPLE 14

Stannous chloride was used in place of aluminum nitrate, and otherwise in the same manner as in the Example 2, a catalyst was prepared which contained Mg in amounts of 50% by weight as oxides, Sn in amounts of 25% by weight as oxides, Ti in amounts of 25% by weight as oxides, and Au in amounts of 1.6% by weight as metals.

EXAMPLE 15

Ferric nitrate was used in place of aluminum nitrate, and otherwise in the same manner as in the Example 1, a catalyst was prepared which contained Mg in amounts of 90% by weight as oxides, Fe in amounts of 9% by weight as oxides, and Au in amounts of 1.6% by weight as metals.

EXAMPLE 16

An aqueous solution of chloroauric acid having a concentration of 33 g/l as Au and containing Na in amounts of 3 g/l was used in place of chloroauric acid, and otherwise in the same manner as in the Example 2, a catalyst was prepared which contained Mg in amounts of 50% by weight as oxides, Na in amounts of 0.2% by weight as oxides, Al in amounts of 25% by weight as oxides, Ti in amounts of 25% by weight as oxides, and Au in amounts of 1.6% by weight as metals.

EXAMPLE 17

The catalyst prepared in the Example 4 was calcined at 400° C. over one hour under a $N_2/H_2$ (1/1 in volume) atmosphere.

DENITRIZATION

A gas composed of 200 ppm of NO, 2% of $O_2$, 10% of $H_2O$ and the balance $N_2$ was passed through the catalysts in a space velocity of 1000 $hr^{-1}$ at 300° C., 400° C. and 500° C., respectively. The conversion rates of NO to $N_2$ are shown in the Table 3.

Further, a gas composed of 200 ppm of NO, 200 ppm of CO, 2% of $O_2$, 10% of $H_2O$ and the balance $N_2$ was passed through the catalysts in a space velocity of 1000 $hr^{-1}$ at 300° C., 400° C. and 500° C., respectively. The conversion rates of NO to $N_2$ are shown in the Table 4.

TABLE 3

| Catalysts | Denitrizing Temperature (°C.) | | |
|---|---|---|---|
| | 400 | 500 | 600 |
| Example | | | |
| 1 | 56.7 | 67.2 | 70.6 |
| 2 | 73.3 | 86.9 | 85.5 |
| 3 | 69.7 | 82.7 | 82.1 |
| 4 | 83.2 | 94.6 | 94.2 |
| 5-1 | 54.6 | 78.1 | 78.7 |
| 5-2 | 63.9 | 82.7 | 83.6 |
| 5-3 | 69.9 | 87.8 | 88.4 |
| 6 | 37.0 | 56.4 | 60.5 |
| 7 | 63.4 | 81.9 | 83.4 |
| 8 | 71.0 | 87.3 | 86.8 |
| 9 | 69.5 | 84.2 | 83.8 |
| 10 | 65.7 | 80.7 | 83.0 |
| 11 | 59.2 | 77.5 | 79.1 |
| 12 | 52.3 | 70.9 | 74.6 |
| 13 | 63.6 | 82.5 | 80.9 |
| 14 | 64.9 | 83.1 | 81.9 |
| 15 | 45.2 | 64.5 | 63.8 |
| 16 | 73.4 | 89.0 | 88.5 |
| 17 | 88.1 | 97.3 | 96.8 |

TABLE 4

| Catalysts | Denitrizing Temperature (°C.) | | |
|---|---|---|---|
| | 400 | 500 | 600 |
| Example | | | |
| 1 | 63.4 | 73.8 | 76.9 |
| 2 | 79.5 | 91.2 | 90.1 |
| 3 | 75.6 | 87.8 | 87.3 |
| 4 | 88.2 | 97.0 | 96.5 |
| 5-1 | 61.2 | 83.9 | 83.3 |
| 5-2 | 70.7 | 87.1 | 88.8 |
| 5-3 | 76.2 | 91.6 | 90.7 |
| 6 | 43.9 | 62.8 | 67.2 |
| 7 | 70.3 | 86.1 | 88.5 |
| 8 | 77.4 | 91.2 | 90.6 |
| 9 | 75.9 | 89.0 | 88.3 |
| 10 | 71.8 | 86.1 | 88.0 |
| 11 | 65.5 | 83.3 | 84.2 |
| 12 | 58.9 | 77.3 | 80.7 |
| 13 | 70.3 | 87.2 | 84.2 |
| 14 | 71.5 | 87.7 | 85.1 |
| 15 | 51.4 | 73.4 | 70.5 |
| 16 | 79.6 | 92.9 | 92.5 |
| 17 | 91.4 | 98.2 | 97.9 |

What is claimed is:

1. A method of denitrizing nitrogen oxides contained in waste gases which consists essentially of: putting the waste gases into contact with a denitrizing catalyst which comprises:
   (a) an alkali metal oxide or an alkaline earth metal oxide in amounts of 50-90% by weight as oxides;
   (b) at least one metal oxide selected from the group consisting of $Co_3O_4$, $Cu_2O$, $Mn_2O_3$, NiO, PbO, $Bi_2O_3$ and $MoO_2$ in amounts of 5-50% by weight as oxides; and
   (c) at least one metal or oxide of a metal selected from the group consisting of Ru, Rh, Pd, Ag, Pt and Au in amounts of 0.01-10% by weight as metals,
in the presence or absence of carbon monoxide as a reducing agent at a temperature of 400°-600° C.

2. A method of denitrizing nitrogen oxides contained in waste gases which comprises: putting the waste gases into contact with a denitrizing catalyst which consists essentially of:
   (a) an alkali metal oxide or an alkaline earth metal oxide in amounts of 50-90% by weight as oxides;
   (b) at least one metal oxide selected from the group consisting of $Al_2O_3$, $SiO_2$, $ZrO_2$, $Fe_2O_3$, $TiO_2$, $WO_3$, $MoO_3$, $SnO_2$ and ZnO in amounts of 5-50% by weight as oxides; and
   (c) at least one metal or oxide of a metal selected from the group consisting of Ru, Rh, Pd, Ag, Pt and Au in amounts of 0.01-10% by weight as metals;
in the presence or absence of carbon monoxide as a reducing agent at a temperature of 400°-600° C.

3. A method of denitrizing nitrogen oxides contained in waste gases which comprises: putting the waste gases into contact with a denitrizing catalyst which consists essentially of:
   (a) an alkali metal oxide or an alkaline earth metal oxide in amounts of 75-90% by weight as oxides;
   (b) at least one metal oxide selected from the group consisting of $Co_3O_4$, $Cu_2O$, $Mn_2O_3$, NiO, PbO, $Bi_2O_3$ and $MoO_2$ in amounts of 10-25% by weight as oxides; and
   (c) at least one metal or oxide of a metal selected from the group consisting of Ru, Rh, Pd, Ag, Pt and Au in amounts of 0.1-5% by weight as metals,
in the presence or absence of carbon monoxide as a reducing agent at a temperature of 400°-600° C.

4. A method of denitrizing nitrogen oxides contained in waste gases which comprises: putting the waste gases into contact with a denitrizing catalyst which consists essentially of:
   (a) an alkali metal oxide or an alkaline earth metal oxide in amounts of 75-90% by weight as oxides;
   (b) at least one metal oxide selected from the group consisting of $Al_2O_3$, $SiO_2$, $ZrO_2$, $Fe_2O_3$, $TiO_2$, $WO_3$, $MoO_3$, $SnO_2$ and ZnO in amounts of 10-25% by weight as oxides; and
   (c) at least one metal or oxide of a metal selected from the group consisting of Ru, Rh, Pd, Ag, Pt and Au in amounts of 0.1-5% by weight as metals;
in the presence or absence of carbon monoxide as a reducing agent at a temperature of 400°-600° C.

* * * * *